United States Patent
Tao et al.

(10) Patent No.: US 12,533,797 B2
(45) Date of Patent: Jan. 27, 2026

(54) ROBOT CONTROL METHOD, ROBOT AND COMPUTER-READABLE STORAGE MEDIUM

(71) Applicant: UBTECH ROBOTICS CORP LTD, Shenzhen (CN)

(72) Inventors: Bo Tao, Shenzhen (CN); Chunyu Chen, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 176 days.

(21) Appl. No.: 18/424,323

(22) Filed: Jan. 26, 2024

(65) Prior Publication Data
US 2024/0399567 A1 Dec. 5, 2024

(30) Foreign Application Priority Data
Jan. 28, 2023 (CN) .......................... 202310144689.4

(51) Int. Cl.
*B25J 9/16* (2006.01)
*B60L 15/20* (2006.01)
*B62D 57/028* (2006.01)

(52) U.S. Cl.
CPC ............. *B25J 9/1607* (2013.01); *B60L 15/20* (2013.01); *B62D 57/028* (2013.01)

(58) Field of Classification Search
None
See application file for complete search history.

(56) References Cited

U.S. PATENT DOCUMENTS

| 2015/0088469 A1* | 3/2015 | Nagarajan | B25J 9/1671 703/2 |
| 2021/0165375 A1* | 6/2021 | Zhao | G05B 13/048 |
| 2023/0264356 A1* | 8/2023 | Jiang | B62D 57/024 700/245 |

OTHER PUBLICATIONS

Stanford, Infinite horizon linear quadratic regulator Accessed through: https://web.stanford.edu/class/ee363/lectures/dlqr-ss.pdf (Year: 2009).*
MIT, Feedback Control Systems Accessed through: https://ocw.mit.edu/courses/16-30-feedback-control-systems-fall-2010/1bfc976fcead1982d90c5057511e5ef7_MIT16_30F10_lec05.pdf (Year: 2010).*
"Design and Control of a Wheel-Biped Switchable Robot System", Liu Tangyou, Chinese Excellent Master's Thesis Full Text Database (Information Technology Collection), Issue 03, 2022, 1140-1085.
"Modeling and LQR Control Algorithm of a Two-degree-of-freedom Single-stage Inverted Pendulum System Based on an omnidirectional mobile platform", Quo Shuai et al., Industrial Control Computer, vol. 30, Issue 05, pp. 73-75.

* cited by examiner

Primary Examiner — Arslan Azhar

(57) ABSTRACT

A robot control method includes: building a two-wheeled inverted pendulum model based on a wheel-legged robot; constructing initial state-space equations based on the two-wheeled inverted pendulum model; linearizing the initial state-space equations to obtain the state-space equations for a linear time-invariant system; obtaining a quadratic performance objective function according to the state-space equations for the linear time-invariant system; and solving the quadratic performance objective function by a linear quadratic regulator to obtain wheel torques of the wheel-legged robot, and controlling the wheel-legged robot according to the wheel torques.

20 Claims, 7 Drawing Sheets

ROBOT CONTROL METHOD, ROBOT AND COMPUTER-READABLE STORAGE MEDIUM

CROSS REFERENCE TO RELATED APPLICATIONS

This application claims priority to Chinese Patent Application No. CN 202310144689.4, filed Jan. 28, 2023, which is hereby incorporated by reference herein as if set forth in its entirety.

TECHNICAL FIELD

The present disclosure generally relates to robots, and in particular relates to a robot control method, robot and computer-readable storage medium.

BACKGROUND

A two-wheeled legged robot combines the advantages of wheeled robots in terms of high energy efficiency and speed, with the high terrain adaptability of legged robots, expanding its potential applications to a wider range of scenarios. However, the two-wheeled legged robot is susceptible to disturbances from unknown terrains or external factors during operation, leading to instability and potential falls.

Therefore, there is a need for an effective and robust motion control method that allows the robot to respond quickly to external disturbances and maintain stable body posture.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
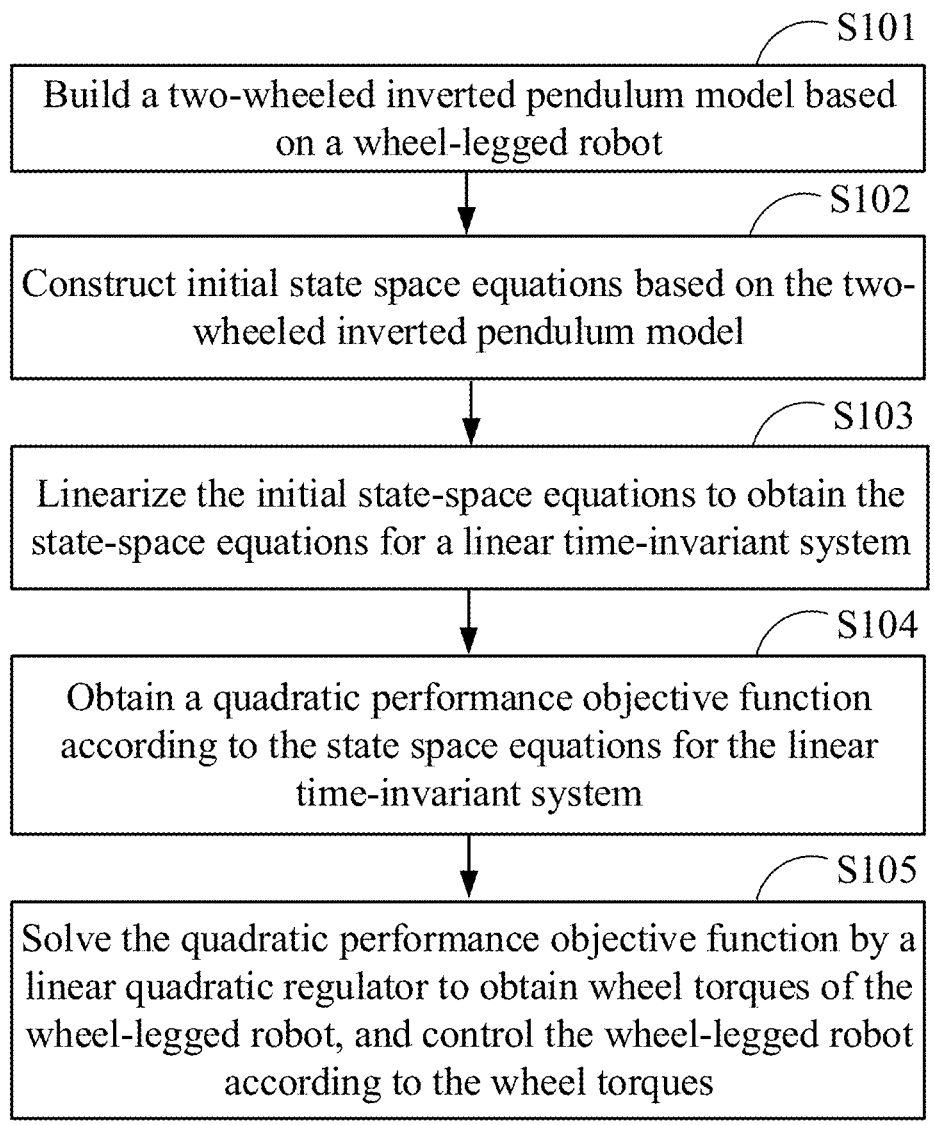
FIG. 1 is an exemplary flowchart of a robot control method according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

In one embodiment, a robot may include a processor, a storage, and one or more executable computer programs that are stored in the storage. The storage and the processor are directly or indirectly electrically connected to each other to realize data transmission or interaction. For example, they can be electrically connected to each other through one or more communication buses or signal lines. The processor performs corresponding operations by executing the executable computer programs stored in the storage. When the processor executes the computer programs, the steps in the embodiments of a robot control method, such as steps S101 to S105 in FIG. 1 are implemented.

The processor may be an integrated circuit chip with signal processing capability. The processor may be a central processing unit (CPU), a general-purpose processor, a digital signal processor (DSP), an application specific integrated circuit (ASIC), a field-programmable gate array (FPGA), a programmable logic device, a discrete gate, a transistor logic device, or a discrete hardware component. The general-purpose processor may be a microprocessor or any conventional processor or the like. The processor can implement or execute the methods, steps, and logical blocks disclosed in the embodiments of the present disclosure.

The storage may be, but not limited to, a random-access memory (RAM), a read only memory (ROM), a programmable read only memory (PROM), an erasable programmable read-only memory (EPROM), and an electrical erasable programmable read-only memory (EEPROM). The storage may be an internal storage unit of the robot, such as a hard disk or a memory. The storage may also be an external storage device of the robot, such as a plug-in hard disk, a smart memory card (SMC), and a secure digital (SD) card, or any suitable flash cards. Furthermore, the storage may also include both an internal storage unit and an external storage device. The storage is to store computer programs, other programs, and data required by the robot. The storage can also be used to temporarily store data that have been output or is about to be output.

Figure 7:
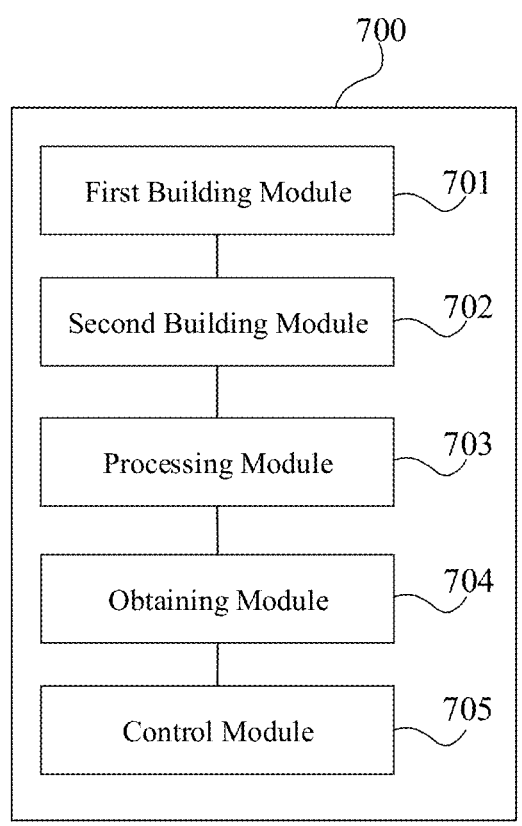
FIG. 7 is a schematic block diagram of a robot control device according to one embodiment.

Exemplarily, the one or more computer programs may be divided into one or more modules/units, and the one or more modules/units are stored in the storage and executable by the processor. The one or more modules/units may be a series of computer program instruction segments capable of performing specific functions, and the instruction segments are used to describe the execution process of the one or more computer programs in the robot. For example, the one or more computer programs may be divided into a first building module 701, a second building module 702, a processing module 703, an obtaining module 704, and a control module 705 as shown in FIG. 7.

The robot may include more or fewer components than what is described above, or have a different configuration than what is described above. Each component described above may be implemented in hardware, software, or a combination thereof.

FIG. 1 is an exemplary flowchart of a robot control method according to one embodiment. As an example, but not a limitation, the method can be implemented by the above-mentioned robot. The method may include the following steps.

Step S101: Build a two-wheeled inverted pendulum model based on a wheel-legged robot.

In one embodiment, the wheel-legged robot may be a two-wheeled robot that has a parallel leg mechanism having many leg members. Establishing a full dynamic model for this parallel leg mechanism would result in excessive computational complexity, making it challenging to ensure real-time control. In order to simplify computations and improve the real-time control, the complex wheel-legged robot is simplified into a two-wheeled inverted pendulum model, and the mass of the leg members is ignored.

Figure 2:
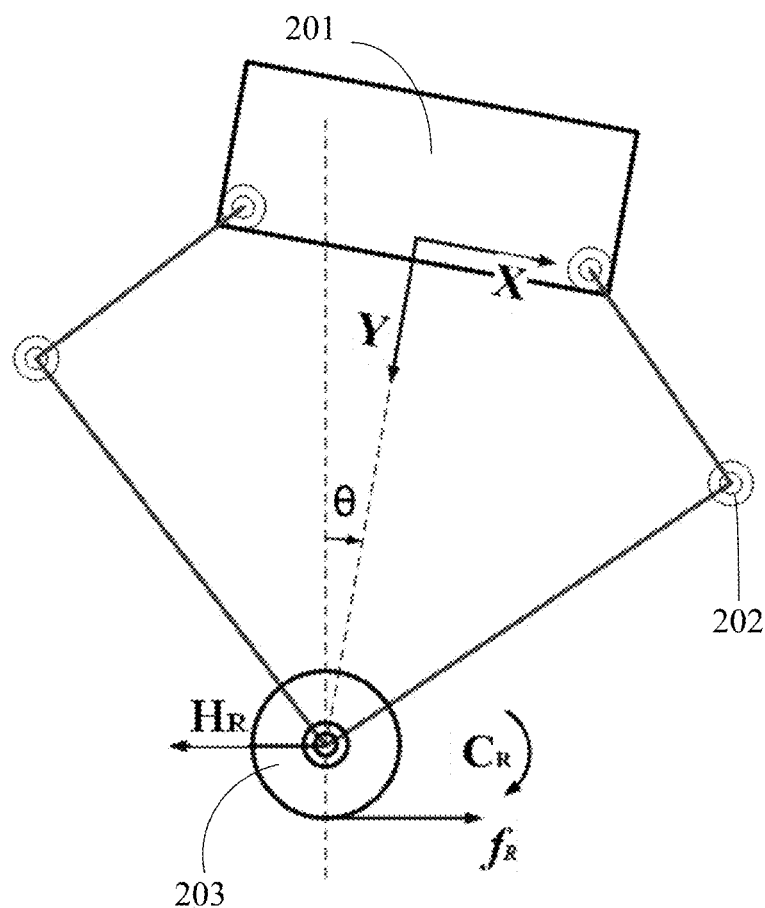
FIG. 2 is a schematic diagram of the robot according to one embodiment.

FIG. 2 shows a schematic diagram of one side leg member of the wheel-legged robot. A wheel 203 is connected to rotating shafts 202 through connecting rods, and the rotating shafts 202 are connected to the rotating shaft on a body 201 through the connecting rods. It should be noted that the left and right sides of the wheel-legged robot have the same connection relationship between the leg members. In FIG. 2, only the connection relationship among the leg members on one side of the wheel-legged robot is shown. In addition, in FIG. 2, $f_R$ represents the friction force from the ground on the wheel, R represents the right wheel, $H_R$ represents the horizontal component of the force exerted by the body and the leg members on the right axle, and H is horizontal.

Figure 3:
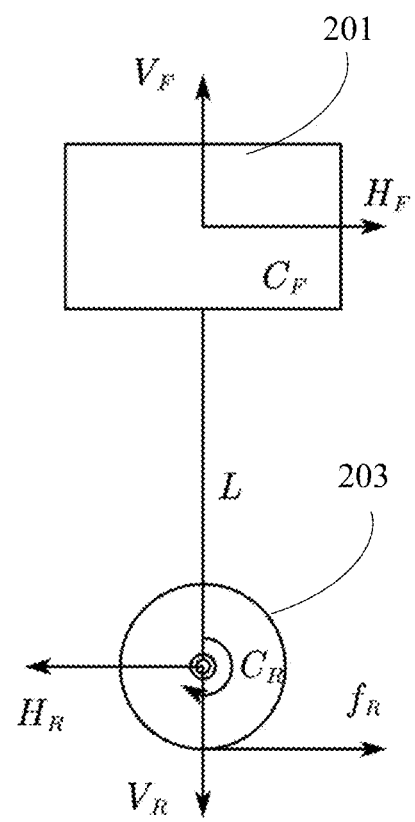
FIG. 3 is a schematic diagram of a two-wheeled inverted pendulum model according to one embodiment.

FIG. 3 shows a schematic structural diagram of a two-wheeled inverted pendulum model that includes wheels 203 and a body 201. The connecting rods and rotating shafts in FIG. 2 are simplified to obtain the two-wheeled inverted pendulum model shown in FIG. 3. In FIG. 3, $V_R$ represents the vertical component of the force exerted by the body and leg members on the right axle, and V is vertical. $f_R$ represents the friction force on the wheel from the ground. HR represents the horizontal component of the force exerted by the body and leg members on the right axle. $C_R$ represents right-wheel torque.

Step S102: Construct initial state space equations based on the two-wheeled inverted pendulum model.

In one embodiment, the wheel-legged robot is simplified into a two-wheeled inverted pendulum model, and the mass of the leg members are ignored to construct a two-wheeled inverted pendulum model as shown in FIG. 3. Using a simplified back-end two-wheeled inverted pendulum model to construct the control initial state space equations can significantly reduce the dynamics solution time.

In one embodiment, the following initial state space equations can be established:

$$\left(\frac{2I_\omega}{R^2} + 2m + M\right)\ddot{x} + ML\ddot{\theta} = \frac{1}{R}(C_l + C_r)$$

$$I_\theta \cdot \ddot{\theta} = MgL\theta + 2L\left(m + \frac{I_\omega}{R^2}\right)\ddot{x} - \left(1 + \frac{L}{R}\right)(C_l + C_r)$$

$$\left(\frac{2I_\delta}{D} + \frac{DI_\omega}{R^2} + Dm\right) \cdot \ddot{\delta} = \frac{1}{R}(C_r - C_l)$$

where M is the mass of the body of the wheel-legged robot, m is the mass of a single wheel of the wheel-legged robot, R is the radius of the wheel, D is the distance between the left and right wheels of the wheel-legged robot, L is the distance from the center of mass of the body of the wheel-legged robot to the wheel axis, θ is the angle (pitch angle) between the body in the forward direction and the Z-axis of the world coordinate system, δ is the angle (yaw angle) of the body around the Y-axis of the world coordinate system, $I_w$ is the moment of inertia of the wheels around the axis of rotation, $I_\delta$ is the moment of inertia of the robot around the yaw direction, $I_\theta$ is the moment of inertia of the body around the pitch axis, x is the forward displacement of the body, $C_l$ and $C_r$ are the output torque of the left and right wheels, $\ddot{\theta}$ represents the second-order derivative of the angle of the body around the Y-axis of the world coordinate system, and $\ddot{x}$ represents the second derivative of the forward displacement of the body. The initial state space equations are referred to as system of equations A.

Step S103: Linearize the initial state-space equations to obtain the state-space equations for a linear time-invariant system.

In one embodiment, the state space equations near the equilibrium point, which are obtained according to the system of equations A, are expressed as follows:

$$x = [\dot{x}\ \dot{\delta}\ \theta\ \dot{\theta}]^T, u = [C_l\ C_r]^T$$

$$\dot{x} = Ax + Bu$$

where A and B are both constant coefficient matrices, which are derived from the first system of equations, $\dot{\theta}$ represents the first derivative of the angle of the body around the Y axis of the world coordinate system, $\dot{x}$ represents first derivative of the forward displacement of the body, and $\dot{\delta}$ represents the first derivative of the angle of the body around the Y-axis of the world coordinate system. The state space equations near the equilibrium point are referred to as system of equations B.

It should be noted that the process of deriving A and B through the system of equations A is to linearize the system of equations A and A and B can be obtained by rewriting the system of equations into matrix form.

Step S104: Obtain a quadratic performance objective function according to the state space equations for the linear time-invariant system.

In one embodiment, the object of the linear quadratic regulator is a linear system given in the form of state space in modem control theory. The objective function is a quadratic function of the object state and control input. Based on the state space equations of the linear time-invariant system described by the system of equations B, the following quadratic performance objective function is designed: $J=\int_0^\infty (X^TQX+u^TRu)dt$, where x is an n-dimensional state vector, u is an r-dimensional input vector, Q is a positive semi-definite matrix, R is a positive definite matrix, and the weighting matrices Q and R are to balance the weights of the state vector and the input vector. The equation above is referred to as the equation C.

In one embodiment, n can be equal to 4, r can be equal to 2, and the n-dimensional state vector is x in the system of equations B. When n is equal to 4, the 4-dimensional state vector includes the first derivative of the forward position of the robot (forward velocity), the first derivative of the yaw angle of the body (steering angular velocity), the pitch angle of the body (forward tilt angle), and the first derivative of the pitch angle of the body (forward angular velocity). When r is equal to 2, the 2-dimensional input vector is u in the system of equations B, which is the torque input by the controller to the left and right wheels, i.e., $C_l$ and $C_r$.

Step S105: Solve the quadratic performance objective function by a linear quadratic regulator to obtain wheel torques of the wheel-legged robot, and control the wheel-legged robot according to the wheel torques.

In this way, the wheel torques of the wheel-legged robot can be quickly determined, reducing computational complexity, minimizing computation time, and improving real-time performance. In other words, step S105 means solving the optimization problem for the quadratic performance objective function so as to obtain the torques corresponding to the minimum function value.

In one embodiment, step S105 may further include the following steps: using the wheel torques as control commands, and inputting the control commands into wheel motors of the wheel-legged robot, and controlling the wheel motors to output torques that are respectively equal to the wheel torques according to the control commands.

In one embodiment, by real-time optimization of the objective function J in the equation C, its value is minimized to obtain the corresponding u. Then u is input as a control command to the wheel motors to achieve rapid control of the wheel-legged robot.

In one embodiment, the method may further include the following step: obtaining a number of actual state variables of the wheel-legged robot after the wheel motors output the torques that are respectively equal to the wheel torques.

In one embodiment, the multiple actual state variables are the actual states of the wheel-legged robot after undergoing control (state transfer). For example, the multiple actual state variables can be the actual pitch angle and actual yaw angle of the wheel-legged robot, actual forward displacement of the body, measured values of the foot-end positions, measured values of the height of the legs of the wheel-legged robot, measured values of the velocity of the center of mass of the body of the wheel-legged robot, measured values of the roll angle of the wheeled-legged robot, and measured values of the roll angular velocity.

Figure 5:
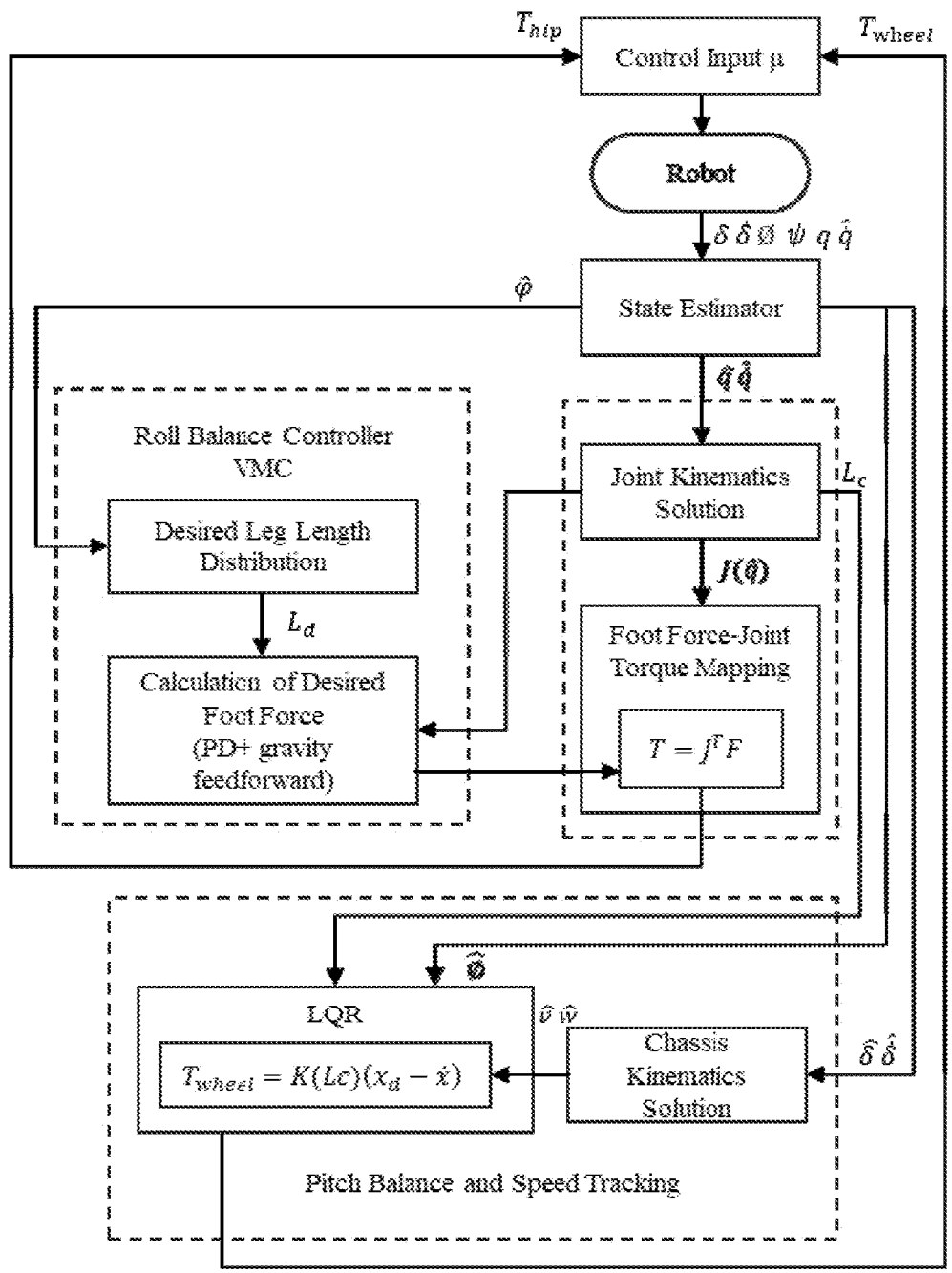
FIG. 5 is a control schematic diagram of the wheel-legged robot according to one embodiment.

Referring to FIG. 5, in one embodiment, the method may further include steps S106 to S1011.

Step S106: Perform forward kinematics analysis on a leg planar five-bar mechanism of the wheel-legged robot to obtain a system of equations for foot endpoints of the wheel-legged robot.

Figure 4:
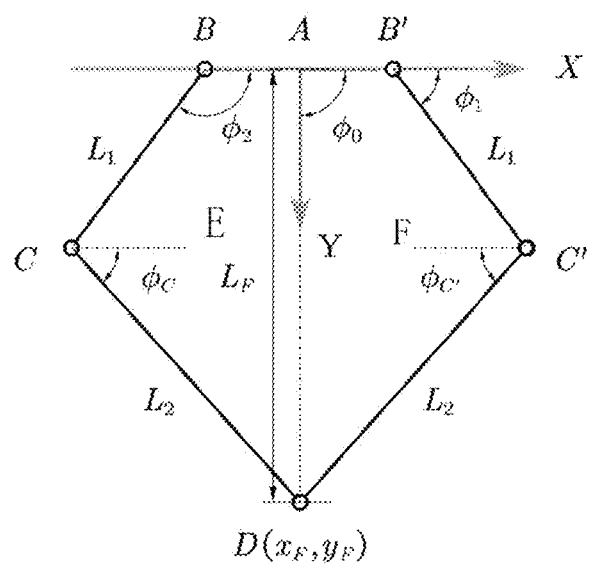
FIG. 4 is another schematic diagram of the robot according to one embodiment.

In one embodiment, the length of the two legs of the wheel-legged robot is controlled based on the pose feedback of an inertial measurement unit (IMU), thereby achieving the purpose of stabilizing the lateral rolling pose. To control the robot leg length $L_F$, as shown in FIG. 4, a leg planar five-bar mechanism of the wheel-legged robot includes a first kinematic branch chain ABCD and a second kinematic branch chain AB'C'D. The two kinematic branch chains join at point D at the end of the foot, forming a closed graph. In a feedback control (i.e., PD control), P is the proportional coefficient of the state error (feedback term), and D is the damping coefficient (derivative) of the error.

In one embodiment, it is necessary to perform forward kinematic analysis on the leg planar five-bar mechanism of the wheel-legged robot to obtain the coordinates of the foot endpoints, as represented by the following equations:

$$x_c = -\frac{L_0}{2} + L_1\cos\emptyset_2, \; y_c = L_1\sin\emptyset_2$$

$$x_{c'} = \frac{L_0}{2} + L_1\cos\emptyset_1, \; y_{c'} = L_1\sin\emptyset_1$$

where $L_0$ represents the distance from point B to point B', $\emptyset_1$ represents the angle of $\angle ABC$, $\emptyset_2$ represents the angle of $\angle XB'C'$, the distances of BC and B'C' are equal to $L_1$, the distances of CD and C'D are equal to $L_2$, and foot endpoint D is represented by $(x_d, y_d)$. The equations above are referred to as system of equations D.

Referring to FIG. 4, the two kinematic branch chains ABCD and AB'C'D join at foot endpoint D. A system of equations can be established based on this geometric relationship as follows:

$$\begin{cases} x_d = x_c + L_2\cos\emptyset_c = x_{c'} - L_2\cos\emptyset_{c'} \\ y_d = y_c + L_2\sin\emptyset_c = y_{c'} + L_2\sin\emptyset_{c'} \end{cases}$$

where $\emptyset_c$ represents the angle of $\angle ECD$, $\emptyset_{c'}$ represents the angle of $\angle FC'D$, and $(x_d, y_d)$ represents the coordinates of point D. The equations above are referred to as system of equations E.

Step S107: Obtain a foot endpoint vector expression according to the system of equations.

In one embodiment, virtual model control (VMC) is an intuitive control method, the key of which is to construct appropriate virtual components on each degree of freedom that needs to be controlled to generate appropriate virtual forces. The virtual forces are not the forces or torques of actual actuators, but are converted by a mechanism through the action of the actuators. In order to map the force or moment in the work space (i.e., task space) to the joint moment in the joint space, the position mapping relationship between the two spaces is required. This position mapping relationship is the forward kinematics model. The system of equations E can be expressed in a vector form as follows: $x=f(q)$, where $x=[x_F \; y_F]^T$, $q=[\emptyset_1 \; \emptyset_2]^T$, and $(x_F, y_F)$ represent the coordinates of the foot endpoint. The equation above is referred to as equation F.

It should be added that the system of equations above is constructed within the scope of geometric analysis, and the vector-form equations are constructed within the context of dynamic modeling. Even if both represent the same foot endpoint, they are expressed using different forms.

Step S108: Obtain a velocity Jacobian matrix of a leg parallel structure of the wheel-legged robot according to the foot endpoint vector expression.

In one embodiment, step S108 may include the following steps: performing total differential processing on the foot endpoint vector expression to obtain a total differential expression; and determining the velocity Jacobian matrix according to the total differential expression.

In one embodiment, the following equation G can be obtained by finding the total differential of system of equations E with respect to x:

$$\delta x = \begin{bmatrix} \frac{\partial f_1}{\partial \emptyset_1} & \frac{\partial f_1}{\partial \emptyset_2} \\ \frac{\partial f_2}{\partial \emptyset_1} & \frac{\partial f_2}{\partial \emptyset_2} \end{bmatrix} \delta q.$$

From equation G, the velocity Jacobian matrix J of the leg parallel structure of the wheel-legged robot can be obtained:

$$J = \begin{bmatrix} \frac{\partial f_1}{\partial \emptyset_1} & \frac{\partial f_1}{\partial \emptyset_2} \\ \frac{\partial f_2}{\partial \emptyset_1} & \frac{\partial f_2}{\partial \emptyset_2} \end{bmatrix},$$

which is referred to as equation H.

Step S109: Determine a mapping relationship between the velocity Jacobian matrix, hip joint driving torque vectors and two-dimensional contact forces applied to the foot endpoints based on a principle of virtual work.

In one embodiment, according to the principle of virtual work, the mapping relationship between the hip joint driving torque vectors $T=[T_1\ T_2]^T$ and the two-dimensional contact force $F=[F_x\ F_y]^T$ applied to point D of the foot endpoints can be obtained: $T=J^TF$, which is referred to as equation I.

Step S1010: Incorporate virtual spring-damper elements into the wheel-legged robot and establishing a feedback control framework.

In one embodiment, step S1010 may include the following steps: arranging the virtual spring-damper elements in a first direction and a second direction of the foot endpoints of the wheel-legged robot, as well as in a roll direction of the wheel-legged robot, to establish a three-channel feedback control framework.

Specifically, virtual spring-damper elements are introduced in the X-direction and Y-direction at the endpoints of the legs of the robot, and in the roll direction of the body. This establishes a three-channel feedback control framework. It should be noted that the roll direction can also be expressed as the left and right roll direction.

The feedback control in the X direction of the foot end is expressed by the following system of equations J:

$$F_{XR} = K_X(x_{R\_des} - \hat{x}_R) + D_X(v_{XR\_des} - \hat{v}_{XR})$$

$$F_{XL} = K_X(x_{L\_des} - \hat{x}_L) + D_X(v_{XL\_des} - \hat{v}_{XL})$$

where the F in $F_{XR}$ represents the two-dimensional contact force of the foot, the subscript X in $F_{XR}$ represents the component of the two-dimensional contact force in the X direction, the subscript R in $F_{XR}$ represents the foot end of the right leg of the wheel-legged robot, $F_{XR}$ represents the component of the two-dimensional contact force in the X direction applied to the foot end of the right leg of the wheel-legged robot, the F in $F_{XL}$ represents the two-dimensional contact force at the foot end, the subscript X in $F_{XL}$ represents the component of the two-dimensional contact force in the Y direction, the subscript L in $F_{XL}$ represents the foot end of the left leg of the wheel-legged robot, and $F_{XL}$ represents the component of the two-dimensional contact force in the X direction applied to the foot end of the left leg of the wheel-legged robot. The x in $X_{R\_des}$ represents the position of the foot end in the x-axis direction of the body coordinate system, the subscript R in $X_{R\_des}$ represents the foot end of the right leg of the wheel-legged robot, the subscript des in $X_{R\_des}$ represents the desired position, $X_{R\_des}$ represents the desired position of the foot end of the right leg of the wheel-legged robot, the x in $X_{L\_des}$ represents the position of the foot end in the x-axis direction of the body coordinate system, the subscript L in $X_{L\_des}$ represents the foot end of the left leg of the wheel-legged robot, the subscript des in $X_{L\_des}$ represents the desired position, and $X_{L\_des}$ represents the desired position of the foot end of the left leg of the wheel-legged robot. $\hat{x}_R$ represents the measured value of the foot end position of the right leg of the wheel-legged robot, $z_L$ represents the measured value of the foot end position of the left leg of the wheel-legged robot. $V_{XR\_des}$ represents the desired speed of the foot end of the right leg of the wheel-legged robot in the x-axis direction of the body coordinate system, and $V_{XL\_des}$ represents the desired speed of the foot end of the left leg of the wheel-legged robot in the x-axis direction of the body coordinate system. $K_X$ represents the proportional coefficient in the x-axis direction of the body coordinate system. $D_X$ represents the damping coefficient in the x-axis direction of the body coordinate system.

In one embodiment, the feedback control in the Y direction of the foot end is expressed by the following system of equations K:

$$F_{YL} + F_{YR} = K_Y(h_{des} - \hat{h}) + D_Y(v_{X\_des} - \hat{v}_h)$$

$$\hat{h} = \frac{\hat{y}_L + \hat{y}_R}{2}$$

$$\hat{v}_h = \frac{\hat{v}_{YL} + \hat{v}_{YR}}{2}$$

where $F_{YR}$ represents the Y-direction component of the two-dimensional contact force applied to the foot end of the right leg of the wheel-legged robot, $F_{YL}$ represents the Y-direction component of the two-dimensional contact force applied to the foot end of the left leg of the wheel-legged robot, $h_{des}$ represents the desired height of the center of mass of the body of the wheel-legged robot, $\hat{h}$ represents the measured value of the center of mass of the body of the wheel-legged robot, $\hat{y}_L$ represents the measured height of the left leg of the wheeled-legged robot, $\hat{y}_R$ represents the measured height of the right leg of the wheeled-legged robot, $\hat{v}_h$ represents the measured velocity of the center of mass of the body of the wheel-legged robot in the y-axis direction of the body coordinate system, $\hat{v}_{YL}$ represents the measured velocity of the left leg of the wheel-legged robot in the y-axis direction of the body coordinate system, $\hat{v}_{YR}$ represents the measured velocity of the right leg of the wheel-legged robot in the y-axis direction of the body coordinate system, $K_y$ represents the proportional coefficient in the y-axis direction of the body coordinate system, and $D_y$ represents the damping coefficient in the y-axis direction of the body coordinate system.

In the roll direction of the body of the robot, an equation L is expressed as follows: $F_{YR}-F_{YL}=K_{roll}(\varphi_{des}-\hat{\varphi})+D_{roll}(\omega_{des}-\hat{\omega})$, where $F_{YR}$ represents the Y-direction component of the two-dimensional contact force applied to the foot end of the right leg of the wheel-legged robot, $F_{YL}$ represents the Y-direction component of the two-dimensional contact force applied to the foot end of the left leg of the wheel-legged robot, $\varphi_{des}$ represents the desired roll angle, $\hat{\varphi}$ represents the measured roll angle of the wheel-legged robot, measured by the IMU, $\omega_{des}$ represents the desired roll angular velocity, $\omega$ represents the measured roll angular velocity, measured by the IMU, $K_{roll}$ represents the proportional coefficient in the roll direction, and $D_{roll}$ represents the damping coefficient in the roll direction.

In one embodiment, the hip joint driving torques are calculated based on the equations I and L and systems of equations J and K.

Step S1011: Obtain hip joint driving torques of the wheel-legged robot based on the feedback control framework and the mapping relationship, and control the wheel-legged robot according to the hip joint driving torques.

In one embodiment, step S1011 may include the following steps: calculating the two-dimensional contact forces based on the feedback control framework; and calculating the hip joint driving torques based on the calculated two-dimensional contact forces and the mapping relationship.

According to systems of equations J and K and the equation L, the two-dimensional contact force F acting on the foot endpoint D in equation I. Subsequently, the contact force F and the velocity Jacobian matrix J are substituted into equation I to determine the hip joint drive torques of the wheeled-legged robot.

This enables a rapid computation of the hip joint drive torques, reducing computational complexity, minimizing computation time, and improving real-time performance.

Figure 6:
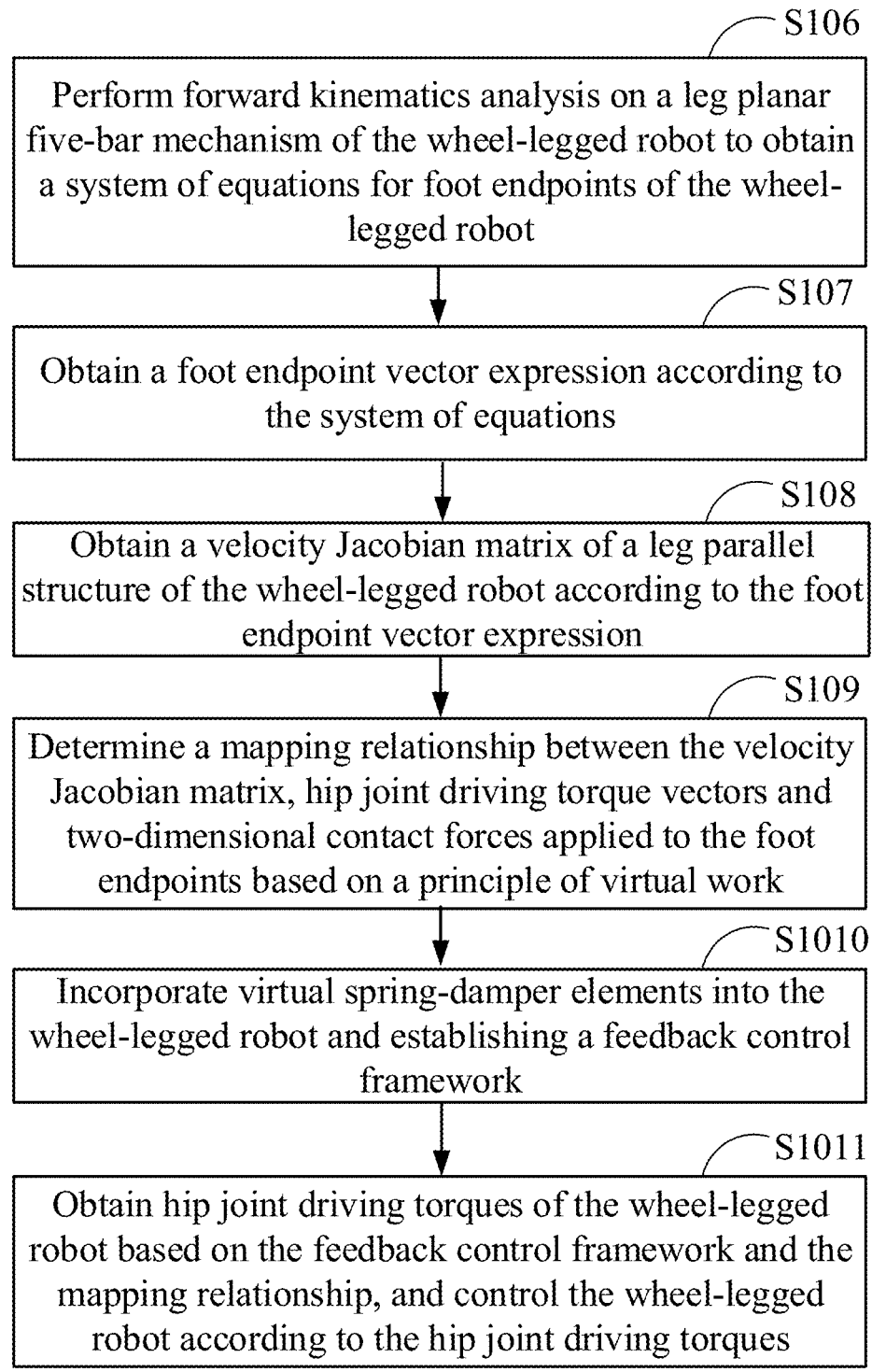
FIG. 6 is another exemplary flowchart of a robot control method according to one embodiment.

Referring to FIG. 6, the control process of the wheel-legged robot is as follows. The control input u is determined according to the hip joint driving torques $T_{hip}$ and the wheel input torques $T_{wheel}$. The wheel-legged robot inputs the angle δ (yaw angle) of the body around the Y-axis of the world coordinate system, the angle φ (pitch angle) of the body around the Z-axis of the world coordinate system, the angle (roll angle) of the body around the X-axis of the world coordinate system, and angle q of each motor into the state estimator. Generally, all robot systems require a state estimator to improve the accuracy of sensor measurement data. Pitch balance and speed tracking are achieved through chassis kinematics solution and LQR. That is, the wheel torques are solved according to the steps S101-S105 to realize the control of the wheel torques of the wheel-legged robot. Additionally, the equation for calculating $T_{wheel}$ is $T_{wheel}=K(Lc)(x_d-\dot{x})$, where $T_{wheel}$ represents the torque vectors of the left and right wheels, K(Lc) represents the gain matrix solved by the LQR controller, which is a function of the height Lc of the center of mass of the body, $x_d$ represents the desired system state vector, and $\dot{x}$ represents the measured value of the current system state vector.

Through joint motion calculation, foot force-joint torque mapping, roll balance controller VCM and calculation of desired foot force (feedback+gravity feedforward), that is, through steps S106-S1011, the hip joint driving torques are calculated. The foot force of the robot is controlled based on the hip joint driving torques. The equation of foot force-joint torque mapping is $T=J^T F$, where T represents the hip joint driving torque vector, $T=[T_1\ T_2]^T$, F represents the two-dimensional contact force on the foot endpoint D, $F=[F_X\ F_Y]^T$.

By implementing the robot control method of the present disclosure, the wheel torques of the wheel-legged robot can be quickly determined, reducing computational complexity, minimizing computation time, and improving real-time performance.

It should be understood that sequence numbers of the foregoing processes do not mean particular execution sequences. The execution sequences of the processes should be determined based on functions and internal logic of the processes, and should not be construed as any limitation on the implementation processes of the embodiments of the present disclosure.

Referring to FIG. 7, in one embodiment, a robot control device includes a first building module 701, a second building module 702, a processing module 703, an obtaining module 704, and a control module 705.

The first building module 701 is to build a two-wheeled inverted pendulum model based on a wheel-legged robot. The second building module 702 is to construct initial state-space equations based on the two-wheeled inverted pendulum model. The processing module 703 is to linearize the initial state-space equations to obtain the state-space equations for a linear time-invariant system. The obtaining module 704 is to obtain a quadratic performance objective function according to the state-space equations for the linear time-invariant system. The control module 705 is to solve the quadratic performance objective function by a linear quadratic regulator to obtain wheel torques of the wheel-legged robot, and control the wheel-legged robot according to the wheel torques.

In one embodiment, the control module 705 is further to use the wheel torques as control commands, and inputting the control commands into wheel motors of the wheel-legged robot and control the wheel motors to output torques that are respectively equal to the wheel torques according to the control commands.

In one embodiment, the control module 705 is further to obtain a number of actual state variables of the wheel-legged robot after the wheel motors output the torques that are respectively equal to the wheel torques.

In one embodiment, the control module 705 is further to: perform forward kinematics analysis on a leg planar five-bar mechanism of the wheel-legged robot to obtain a system of equations for foot endpoints of the wheel-legged robot; obtain a foot endpoint vector expression according to the system of equations; obtain a velocity Jacobian matrix of a leg parallel structure of the wheel-legged robot according to the foot endpoint vector expression; determine a mapping relationship between the velocity Jacobian matrix, hip joint driving torque vectors and two-dimensional contact forces applied to the foot endpoints based on a principle of virtual work; incorporate virtual spring-damper elements into the wheel-legged robot and establishing a feedback control framework; and obtain hip joint driving torques of the wheel-legged robot based on the feedback control framework and the mapping relationship, and control the wheel-legged robot according to the hip joint driving torques.

In one embodiment, the control module 705 is further to calculate the two-dimensional contact forces based on the feedback control framework and calculate the hip joint driving torques based on the calculated two-dimensional contact forces and the mapping relationship.

In one embodiment, the control module 705 is further to arrange the virtual spring-damper elements in a first direction and a second direction of the foot endpoints of the wheel-legged robot, as well as in a roll direction of the wheel-legged robot, to establish a three-channel feedback control framework.

In one embodiment, the control module 705 is further to perform total differential processing on the foot endpoint vector expression to obtain a total differential expression and determine the velocity Jacobian matrix according to the total differential expression.

With such configuration, the wheel torque of the wheeled-legged robot can be quickly determined, reducing computational complexity, minimizing computation time, and improving real-time performance.

It should be noted that content such as information exchange between the modules/units and the execution processes thereof is based on the same idea as the method embodiments of the present disclosure, and produces the same technical effects as the method embodiments of the present disclosure. For the specific content, refer to the foregoing description in the method embodiments of the present disclosure. Details are not described herein again.

Another aspect of the present disclosure is directed to a non-transitory computer-readable medium storing instructions which, when executed, cause one or more processors to perform the methods, as discussed above. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It should be understood that the disclosed device and method can also be implemented in other manners. The device embodiments described above are merely illustrative. For example, the flowcharts and block diagrams in the accompanying drawings illustrate the architecture, functionality and operation of possible implementations of the device, method and computer program product according to embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition, functional modules in the embodiments of the present disclosure may be integrated into one independent part, or each of the modules may be independent, or two or more modules may be integrated into one independent part. in addition, functional modules in the embodiments of the present disclosure may be integrated into one independent part, or each of the modules may exist alone, or two or more modules may be integrated into one independent part. When the functions are implemented in the form of a software functional unit and sold or used as an independent product, the functions may be stored in a computer-readable storage medium. Based on such an understanding, the technical solutions in tie present disclosure essentially, or the part contributing to the prior art, or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

A person skilled in the art can clearly understand that for the purpose of convenient and brief description, for specific working processes of the device, modules and units described above, reference may be made to corresponding processes in the embodiments of the foregoing method, which are not repeated herein.

In the embodiments above, the description of each embodiment has its own emphasis. For parts that are not detailed or described in one embodiment, reference may be made to related descriptions of other embodiments.

A person having ordinary skill in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

A person having ordinary skill in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/terminal device and method may be implemented in other manners. For example, the above-mentioned apparatus (device)/terminal device embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments.

The functional units and modules in the embodiments may be integrated in one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, all or part of the processes in the method for implementing the above-mentioned embodiments of the present disclosure may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random-access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented robot control method comprising:
building a two-wheeled inverted pendulum model based on a wheel-legged robot;
constructing initial state-space equations based on the two-wheeled inverted pendulum model;
linearizing the initial state-space equations to obtain the state-space equations for a linear time-invariant system;
obtaining a quadratic performance objective function according to the state-space equations for the linear time-invariant system; and
solving the quadratic performance objective function by a linear quadratic regulator to obtain wheel torques of the wheel-legged robot, and controlling the wheel-legged robot according to the wheel torques.

2. The method of claim 1, wherein controlling the wheel-legged robot according to the wheel torques comprises:
using the wheel torques as control commands, and inputting the control commands into wheel motors of the wheel-legged robot;
controlling the wheel motors to output torques that are respectively equal to the wheel torques according to the control commands.

3. The method of claim 2, further comprising:
obtaining a plurality of actual state variables of the wheel-legged robot after the wheel motors output the torques that are respectively equal to the wheel torques.

4. The method of claim 1, further comprising:
performing forward kinematics analysis on a leg planar five-bar mechanism of the wheel-legged robot to obtain a system of equations for foot endpoints of the wheel-legged robot;
obtaining a foot endpoint vector expression according to the system of equations;
obtaining a velocity Jacobian matrix of a leg parallel structure of the wheel-legged robot according to the foot endpoint vector expression;
determining a mapping relationship between the velocity Jacobian matrix, hip joint driving torque vectors and two-dimensional contact forces applied to the foot endpoints based on a principle of virtual work;
incorporating virtual spring-damper elements into the wheel-legged robot and establishing a feedback control framework; and
obtaining hip joint driving torques of the wheel-legged robot based on the feedback control framework and the mapping relationship, and controlling the wheel-legged robot according to the hip joint driving torques.

5. The method of claim 4, wherein obtaining hip joint driving torques of the wheel-legged robot based on the feedback control framework and the mapping relationship comprises:
calculating the two-dimensional contact forces based on the feedback control framework; and
calculating the hip joint driving torques based on the calculated two-dimensional contact forces and the mapping relationship.

6. The method of claim 5, wherein incorporating virtual spring-damper elements into the wheel-legged robot and establishing the feedback control framework comprises:
arranging the virtual spring-damper elements in a first direction and a second direction of the foot endpoints of the wheel-legged robot, as well as in a roll direction of the wheel-legged robot, to establish a three-channel feedback control framework.

7. The method of claim 4, wherein obtaining the velocity Jacobian matrix of the leg parallel structure of the wheel-legged robot according to the foot endpoint vector expression comprises:
performing total differential processing on the foot endpoint vector expression to obtain a total differential expression; and
determining the velocity Jacobian matrix according to the total differential expression.

8. A robot comprising:
one or more processors; and
a memory coupled to the one or more processors, the memory storing programs that, when executed by the one or more processors, cause performance of operations comprising:
building a two-wheeled inverted pendulum model based on a wheel-legged robot;
constructing initial state-space equations based on the two-wheeled inverted pendulum model;
linearizing the initial state-space equations to obtain the state-space equations for a linear time-invariant system;
obtaining a quadratic performance objective function according to the state-space equations for the linear time-invariant system; and
solving the quadratic performance objective function by a linear quadratic regulator to obtain wheel torques of the wheel-legged robot, and controlling the wheel-legged robot according to the wheel torques.

9. The robot of claim 8, wherein controlling the wheel-legged robot according to the wheel torques comprises:
using the wheel torques as control commands, and inputting the control commands into wheel motors of the wheel-legged robot;

controlling the wheel motors to output torques that are respectively equal to the wheel torques according to the control commands.

10. The robot of claim 9, wherein the operations further comprise:
obtaining a plurality of actual state variables of the wheel-legged robot after the wheel motors output the torques that are respectively equal to the wheel torques.

11. The robot of claim 8, wherein the operations further comprise:
performing forward kinematics analysis on a leg planar five-bar mechanism of the wheel-legged robot to obtain a system of equations for foot endpoints of the wheel-legged robot;
obtaining a foot endpoint vector expression according to the system of equations;
obtaining a velocity Jacobian matrix of a leg parallel structure of the wheel-legged robot according to the foot endpoint vector expression;
determining a mapping relationship between the velocity Jacobian matrix, hip joint driving torque vectors and two-dimensional contact forces applied to the foot endpoints based on a principle of virtual work;
incorporating virtual spring-damper elements into the wheel-legged robot and establishing a feedback control framework; and
obtaining hip joint driving torques of the wheel-legged robot based on the feedback control framework and the mapping relationship, and controlling the wheel-legged robot according to the hip joint driving torques.

12. The robot of claim 11, wherein obtaining hip joint driving torques of the wheel-legged robot based on the feedback control framework and the mapping relationship comprises:
calculating the two-dimensional contact forces based on the feedback control framework; and
calculating the hip joint driving torques based on the calculated two-dimensional contact forces and the mapping relationship.

13. The robot of claim 12, wherein incorporating virtual spring-damper elements into the wheel-legged robot and establishing the feedback control framework comprises:
arranging the virtual spring-damper elements in a first direction and a second direction of the foot endpoints of the wheel-legged robot, as well as in a roll direction of the wheel-legged robot, to establish a three-channel feedback control framework.

14. The robot of claim 11, wherein obtaining the velocity Jacobian matrix of the leg parallel structure of the wheel-legged robot according to the foot endpoint vector expression comprises:
performing total differential processing on the foot endpoint vector expression to obtain a total differential expression; and
determining the velocity Jacobian matrix according to the total differential expression.

15. A non-transitory computer-readable storage medium storing instructions that, when executed by at least one processor of a robot, cause the at least one processor to perform a method, the method comprising:
building a two-wheeled inverted pendulum model based on a wheel-legged robot;
constructing initial state-space equations based on the two-wheeled inverted pendulum model;
linearizing the initial state-space equations to obtain the state-space equations for a linear time-invariant system;
obtaining a quadratic performance objective function according to the state-space equations for the linear time-invariant system; and
solving the quadratic performance objective function by a linear quadratic regulator to obtain wheel torques of the wheel-legged robot, and controlling the wheel-legged robot according to the wheel torques.

16. The non-transitory computer-readable storage medium of claim 15, wherein controlling the wheel-legged robot according to the wheel torques comprises:
using the wheel torques as control commands, and inputting the control commands into wheel motors of the wheel-legged robot;
controlling the wheel motors to output torques that are respectively equal to the wheel torques according to the control commands.

17. The non-transitory computer-readable storage medium of claim 16, wherein the method further comprises:
obtaining a plurality of actual state variables of the wheel-legged robot after the wheel motors output the torques that are respectively equal to the wheel torques.

18. The non-transitory computer-readable storage medium of claim 15, wherein the method further comprises:
performing forward kinematics analysis on a leg planar five-bar mechanism of the wheel-legged robot to obtain a system of equations for foot endpoints of the wheel-legged robot;
obtaining a foot endpoint vector expression according to the system of equations;
obtaining a velocity Jacobian matrix of a leg parallel structure of the wheel-legged robot according to the foot endpoint vector expression;
determining a mapping relationship between the velocity Jacobian matrix, hip joint driving torque vectors and two-dimensional contact forces applied to the foot endpoints based on a principle of virtual work;
incorporating virtual spring-damper elements into the wheel-legged robot and establishing a feedback control framework; and
obtaining hip joint driving torques of the wheel-legged robot based on the feedback control framework and the mapping relationship, and controlling the wheel-legged robot according to the hip joint driving torques.

19. The non-transitory computer-readable storage medium of claim 18, wherein obtaining hip joint driving torques of the wheel-legged robot based on the feedback control framework and the mapping relationship comprises:
calculating the two-dimensional contact forces based on the feedback control framework; and
calculating the hip joint driving torques based on the calculated two-dimensional contact forces and the mapping relationship.

20. The non-transitory computer-readable storage medium of claim 19, wherein incorporating virtual spring-damper elements into the wheel-legged robot and establishing the feedback control framework comprises:
arranging the virtual spring-damper elements in a first direction and a second direction of the foot endpoints of the wheel-legged robot, as well as in a roll direction of the wheel-legged robot, to establish a three-channel feedback control framework.

* * * * *